INVENTORS
FRED G. RICKER
ROBERT C. RANDALL
BY
*Jearman & Jearman*
ATTORNEYS

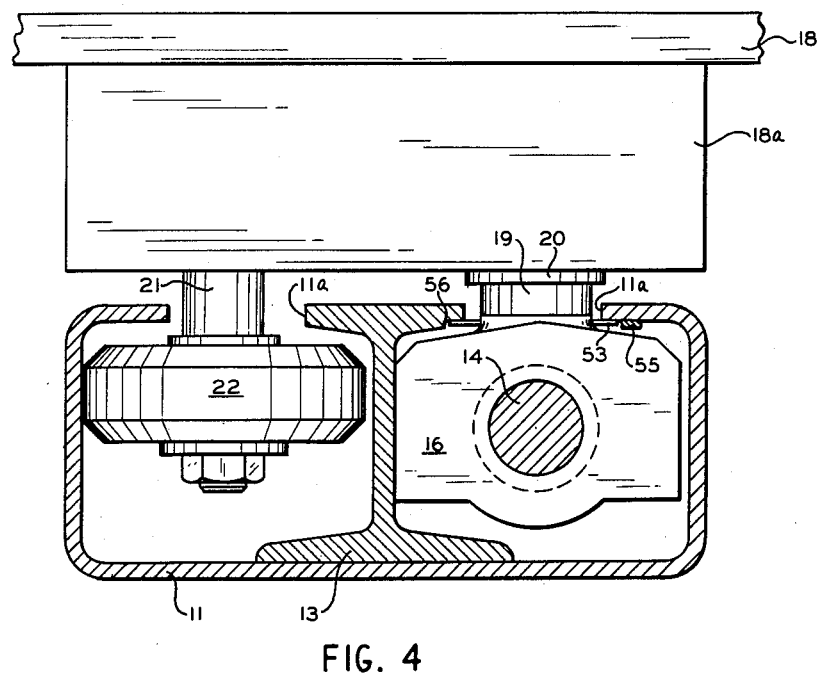
FIG. 4
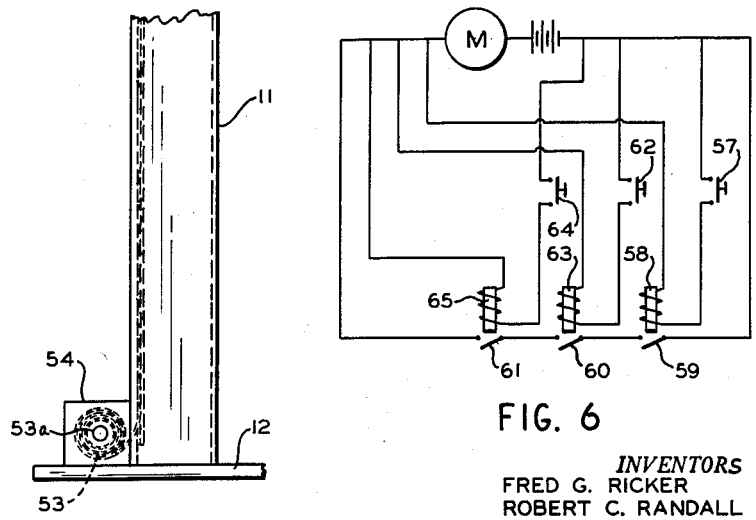
FIG. 5
FIG. 6
INVENTORS
FRED G. RICKER
ROBERT C. RANDALL
BY
*Fearman & Fearman*
ATTORNEYS United States Patent Office 2,917,192
Patented Dec. 15, 1959

2,917,192

DOUGH TROUGH ELEVATORS

Fred G. Ricker and Robert C. Randall, Saginaw, Mich., assignors to Baker Perkins, Inc., Saginaw, Mich.

Application November 2, 1955, Serial No. 544,417

6 Claims. (Cl. 214—313)

This invention relates to dough trough elevators for charging dough batches to mixing machines.

As is well known in the art dough mixers are today commonly provided with electrically controlled, sliding, "sponge" doors in the tops thereof and so called "sponge" chutes are supported in fixed position above the doors for delivering the dough mass after it has been lifted into position by elevating means. In many bakeries the ceiling is too low to permit top loading of the mixer in this manner and the spongy dough mass is cut up and fed by hand in through the discharge slide door in the front wall of the mixer. This has heretofore been a hand operation because elevator apparatus could not be permanently located immediately in front of the latter door without interfering with the discharging operation and because conventional elevator apparatus would not fit in such a bakery.

One of the prime objects of the instant invention is to design an elevator of limited height having an automatically retractable chute which is moved over and down to the front door of the mixer by the dough trough carriage as the latter is dumping and thence returns to a retracted position above the door which does not interfere with a later discharging operation.

A further object of the invention is to design an elevator of the character described which by loading through the front door renders a "sponge" door in the top of the mixer unnecessary.

Another object of the invention is to design sanitary elevator apparatus having dough contacting elements which are readily accessible for cleaning and operative elements which are covered in a manner to promote safety and sanitation in the bakery.

A further object of the invention is to provide elevator apparatus of the type described with a drive arrangement which does not add appreciably to the height of the structure and thus permits the apparatus to be installed in bakeries with low ceilings.

Another object of the invention is to provide elevator apparatus of reliable and sturdy construction which is efficient in operation and can be very economically manufactured and assembled.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

Broadly the invention comprises a dough trough carriage which is raised between columns or the like until it is in position to dump into a pivotally supported chute and thence while dumping pushes the chute from a position outward of and above a mixing machine into a position in which it delivers the spilling dough mass into the mixer.

In the drawings:

Fig. 3 is a fragmentary view similar to Fig. 1 showing the charging chute in retracted position prior to being pushed down by the dumping dough trough carriage.

Fig. 4 is a fragmentary view showing the carriage guide roller which rides on the column guide tracks.

Fig. 5 is a fragmentary, elevational view taken on the line 5—5 of Fig. 1.

Fig. 6 is a schematic circuit diagram depicting control means for operating the elevator motor as desired.

Figure 1:
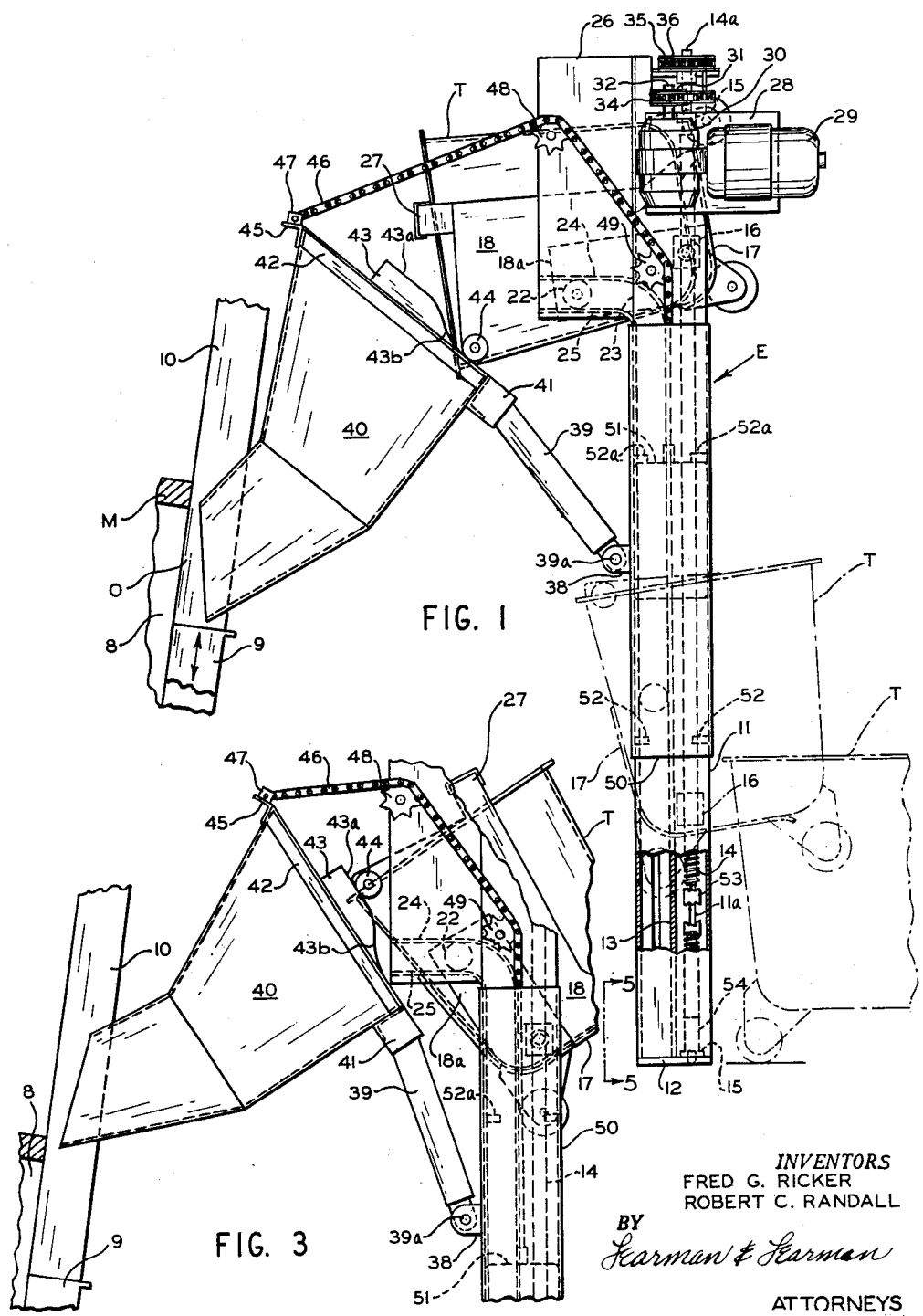
Fig. 1 is a side elevational view of the elevator apparatus showing the charging chute moved over and down to the opening left by the partially retracted front door in the mixer, the diagrammatic lines indicating previous positions of the trough in the process of being raised with the carriage.

Referring now more particularly to the accompanying drawings in which is shown a preferred embodiment of the invention, a letter E generally indicates my elevator apparatus which is shown in position to deliver a dough mass into the interior 8 of a dough mixing machine M in Fig. 1. A door 9 sliding substantially vertically with the door frame guides 10 is in only partially raised position so that an opening O is provided through which the dough can enter the mixer. The apparatus E includes a pair of spaced apart, tubular columns 11 of limited height having feet 12 which may be bolted to the floor of the bakery at a spaced distance in front of the mixing machine M. The columns 11 are partitioned by guides or tracks 13 and as will be seen vertically disposed screws 14 within the columns 11 are journaled in bearings 15 provided for them in the upper and lower ends of the columns. Movable vertically on the screws 14 are carriage supporting nuts 16 which guide on the tracks 13 and are prevented from revolving with the screws 14 thereby.

The trough carriage 17 which is carried by the nuts 16 is angular in shape to receive a dough trough T and is provided with end walls 18. Projecting from the nuts 16 through vertically extending slots 11a in the side walls of the columns 11 are trunnions 19 which are pivotally received in bearings 20 on the end blocks 18a of the carriage to permit the carriage to pivot or revolve relative to the nuts 16. Also provided on the carriage end blocks are shafts 21 extending through similar slots 11a, the shafts having rollers 22 rotatable thereon which guide on the side walls of the columns 11. Openings 23 are provided in the front walls of the columns to pass the rollers 22 which follow the curvilinear guides 24 and 25 on extension plates 26 and tip or pivot the carriage 17 when the latter has been raised a certain distance. In order to hold the trough T in the carriage while the latter is tipping a U shaped strap 27 is provided to span the end walls 18 thereof with the spanning channel beam a spaced distance outwardly of or above the walls 18.

Figure 2:
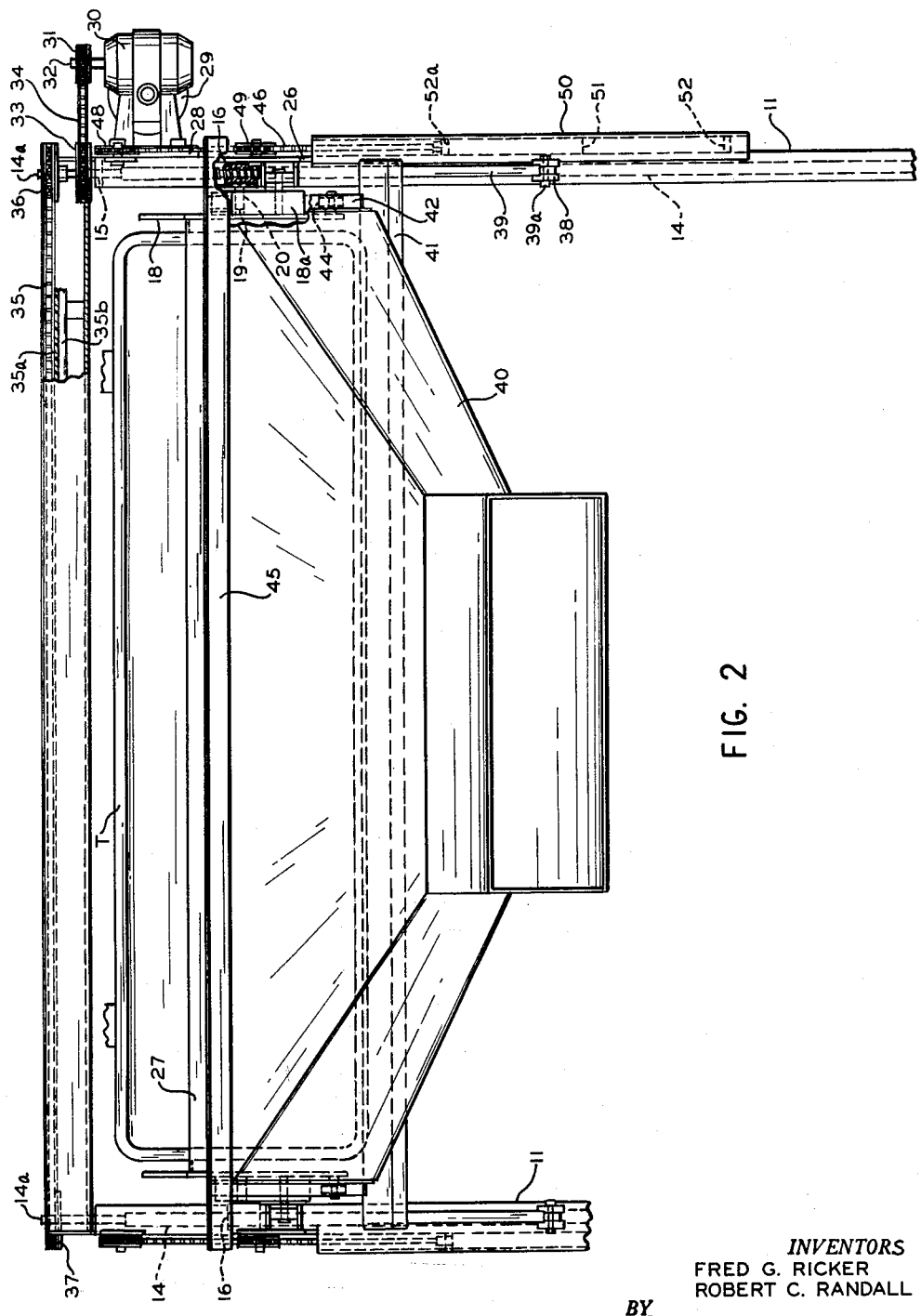
Fig. 2 is a fragmentary front elevational view of the elevator apparatus only.

The shafts 14 which have extensions 14a projecting above the columns 11 need only be of a length or height sufficient to permit the carriage and trough to pivot at the top of the columns through approximately a quarter of a revolution without its interfering with a chain which transmits power from one shaft 14 to the other as will be seen. The screw shaft extensions 14a need project only a very limited distance above the columns 11 in view of the drive arrangement which is provided. Bolted to a mounting plate 28 are a horizontally disposed motor 29 and a vertically disposed reducer 30. A sprocket 31 on the reducer shaft 32 drives a sprocket 33 on the right hand screw shaft 14 (Fig. 2) through the medium of a chain 34, and a chain 35 trained around a sprocket 36 on the extreme upper end of right hand screw 14 in turn drives a sprocket 37 on the left screw shaft 14. The chain 35 runs on a hard surfaced (formica) supporting board 35a which is supported by bars 35b.

Provided on the front wall of each column 11 are ears 38 which pivotally support arms 39 as at 39a. The arms 39 support a chute 40 which has a beam 41 projecting outwardly beyond the chute to which the arms are fixed. Angles 42 mounted on the sides of the chute support cam blocks 43 thereon and it will be noted that the latter are raised as at 43a at their upper ends and thence fall off gradually as at 43b. The end walls 18 of carriage 17 have rollers 44 thereon which, when the carriage is tipping, first engage the portions 43a and pivot the chute 40 downwardly and over to the door opening O in the mixer as shown in Fig. 1. The travel of the chute 40 is relatively fast initially but is slowed appreciably when the rollers 49 travel over the portions 43b of the cams and the chute settles into lowered position. The dough mass passes into the chute after the latter has settled into position.

A beam 45 is fixed to the upper end of the chute 40 and projects laterally beyond the sides of the chute and columns 11 as shown. Chains 46 are connected to blocks 47 on the ends of the beam and lead around sprockets 48 and 49 on the walls 26 and columns 11 respectively into housings 50 provided on the rear walls of the columns 11. Counterweights 51 are fixed to the lower ends of the chains 46 and serve to return the chute 40 to retracted or original position as the emptied trough is returned to original upright position. Stops 52 in the housings 50 limit the fall of the counterweights and prevent them from returning the chute into the path of the carriage 17 and stops 52a may be provided to prevent the chute from swinging over too far.

In order to protect the operator from catching his clothes between the screws 14 and walls of the columns 11 the leading ends of metal tapes 53 which are mounted in casings 54 (see Fig. 5) are connected to the nuts 16 and operate to close off the slots 11a adjacent the screws 14 as the nuts are moved upwardly and while they descend. The tapes are prestressed so that they tend to coil and thus they automatically retract into the casings and rewind around a shaft 53a as the nuts descend. Tape guide bars 55 can be provided adjacent the slots 11a which are closed off by the tapes as the nuts ascend and the partitioning beams can be notched as at 56 to form guides for the tapes; or guides outside the column 11 could be provided.

In operation the troughs T are loaded into the carriage 17 when the latter is down at the foot of the column and the motor is then energized to revolve the screws 14 and raise the nuts 16 and the carriage 17. When the carriage nears the top of the columns 11 the tracks 24 force the guide rollers 22 to travel outwardly through the openings 23 in the columns and thereby cause the carriage to pivot about the nuts 16. When the carriage has tilted to the position in which it is shown in Fig. 3 the rollers 44 contact cam blocks 43 and as the carriage continues to tip the chute 40 is moved down to the position in which it is shown in Fig. 1. The dough mass begins to spill over the side wall of the trough T into the chute 40 only after the rollers 44 have passed down the portions 43b of the cam blocks and the chute is in fully lowered position. When the dough has traveled into the mixer the motor is reversed and the nuts 16 descend as the screws 14 revolve. The carriage will be returned to upright position for descent to the floor below and the counterweights 51 return the chute 40 to a position above the opening O in the mixer as shown. The door 9 in the mixer slides vertically to close the opening 10 therein. In the position in which it is shown it is about three quarters closed since it must hold in the dough mass which empties into the mixer through chute 40. After the dough has been thoroughly worked in the mixer the door 9 is fully lowered to discharge it and as seen in Fig. 3 the chute 40 in retracted position blocks no portion of the opening.

The upper and lower limits of travel of the nuts 16 may be controlled by providing normally closed limit switches in the path of the nuts which interrupt the motor circuit when engaged and opened by one of the nuts 16 at the top and bottom of a column 11 or may be controlled by cam actuated switches in a cam box having a camshaft geared to the motor which interrupts the motor circuit when the motor has revolved sufficiently to travel the nuts a predetermined distance.

A control system which could be employed is schematically illustrated in Fig. 6 wherein a starter push button 57 which under the influence of a spring immediately returns to out position when released (momentary contact button) can be pressed to energize magnetic switch or solenoid 58 and close the switch 59 which was opened when the carriage returned with an empty trough to the bottom of the elevator and stopped reversible motor M. With switches 60 and 61 closed the motor M now revolves until the nut 16 travels upwardly to the point where the carriage is just about to tip whence switch 60 is opened and the motor M stops. After the dough has been discharged from the mixer and the door 9 raised to a position in which it is about three quarters closed a similar push button 62 may be pressed to energize solenoid 63 and close switch 60 so that motor M is energized to raise nut 16 still further and tip the carriage and trough to the position in which it is shown in Fig. 1. At that point switch 61 is opened and the motor stops so that the dough mass can empty into the mixer. In order to return the carriage and empty trough to the bottom of the elevator a similar push button 64 is pressed to reverse the motor and energize solenoid 65 which closes switch 63 and permits the motor to return the carriage and empty trough until switch 59 is opened when the carriage has returned to the bottom. A special circuit for reversing the revolution of the motor which is not shown because it is conventional is energized when the latter button 64 is pressed and, of course, a similar circuit is also energized for reversing the motor again when button 57 is pressed. A safety circuit may also be provided to insure that the switch 60 cannot be closed unless the door 9 is in the three quarters raised position or lower.

It is important to note that the carriage and trough can proceed to uppermost position prior to actuating the chute 40 and do not move the chute until they have commenced to tip to spill the contents of the trough. This permits the operator to run a full dough trough to the top of the elevator into position to tip while a prior batch is mixing. As soon as the prior batch is discharged from the mixer (without interference from chute 40) and the door 9 raises to the position in which it is shown the raised trough can be tipped to immediately move the chute down and recharge the mixer. Thus very little time is lost in discharging the contents of the mixer and recharging the mixer and the latter can be operated almost continuously during a production "run."

It should be apparent that I have perfected a trough hoist or elevator which is particularly well adapted for use in bakeries with relatively low ceilings.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

We claim:

1. In a trough elevator for loading a dough mass into a mixer door opening which is situated a considerable distance above the floor, a supporting frame disposed at a spaced distance from the mixer and door therein, a chute pivotally supported near the upper end of said frame, means normally maintaining said chute between said opening and frame outwardly and free of both, a trough carriage for holding an upright dough containing trough thereon movable upwardly on said frame to a point opposite said chute, means for tilting said carriage and trough toward said chute to empty the dough mass thereinto, and cooperable means on said carriage and chute engageable in response to tipping of said carriage and operable to swing the chute over into position to empty into the opening prior to the time the dough mass commences to spill over the side of the trough into the chute.

2. In trough elevator apparatus for loading a dough mass into an opening provided in a side wall of a mixer a considerable distance above the floor on which the mixer is supported, a supporting frame disposed in front of the said opening at a spaced distance therefrom, a trough carriage holding an upright dough containing trough thereon movable upwardly on said frame to a point slightly above said opening, an inclined chute pivotal relative to said frame adapted to span the distance between the said trough when the latter is in up position adjacent the mixer opening, means normally holding said chute in a position of pivoted adjustment in which the lower discharge end thereof is disposed slightly above said opening and the opposite upper end thereof is out of the path of upward travel of said trough and carriage, means for tilting said carriage and the trough carried thereby toward said chute to spill the dough mass thereinto, means on the said upper end of the chute outwardly of the trough projecting toward the carriage, and means on the carriage engageable with said projecting means and operable in response to tipping of the carriage for swinging the chute down into position to empty into the opening prior to the time the dough mass spills into the chute.

3. In a trough elevator for loading a dough mass into an opening provided in the front wall of a mixer a considerable distance above the floor on which the mixer is supported, a pair of upright columns disposed a spaced distance outwardly of the mixer and the opening therein, vertically disposed screw shafts journaled in said columns, non-rotatable nuts on said screws movable upwardly and downwardly on rotation of said screws, a trough carriage for supporting a dough containing trough thereon pivotally supported on said nuts between said columns, an inclined chute pivotally supported on said columns with its lower discharge end normally located above said opening, means normally maintaining said chute in said position with its upper end outward of the vertical path of travel of said carriage and trough, cam blocks on the sides of said chute projecting toward said columns, said blocks from a rise surface of greatest projection at their upper ends falling off gradually to a surface of least projection at their lower ends, track means on said columns curving laterally toward said chute at their upper ends, guide means on said carriage guiding on said tracks and when the carriage reaches a designated height engaging the laterally curved portions and tipping the carriage and trough toward said chute, and followers on the carriage engaging first the upper ends of said cam blocks as said carriage tilts to said chute to move the latter downwardly substantially to said opening prior to the time the dough mass spills over the trough.

4. In trough elevator apparatus of limited height for loading a dough mass into an opening provided in the front wall of a mixer at a considerable distance above the floor on which the mixer is supported, a pair of upright column housings disposed a spaced distance in front of the mixer and the said opening therein, vertically disposed screw shafts rotatably supported in said columns, non-rotatable nut means on said screws movable upwardly and downwardly within limits on rotation of said screws, a trough carriage for supporting a dough containing trough thereon supported between said nut means, an inclined chute outward of said columns having its lower discharge end adjacent to but spaced from said opening and its upper end terminating adjacent the upper ends of said columns, said screw shafts extending a limiting distance above the upper limit of travel of said nut means, means for tilting said carriage and trough relative to said nut means prior to the time the latter reaches the upper limit of its travel, motor means on one of said columns having a vertically disposed output shaft, sheave means on said output shaft and a screw shaft, with a continuous member trained therearound transmitting the drive of said motor to said screw shaft, and horizontal sheaves on the upper ends of said screw shafts with a continuous member trained therearound for transmitting driving power from one shaft to another while requiring a minimum projection of said screw shafts.

5. In trough elevator apparatus of limited height for loading a dough mass into an opening provided in the front wall of a mixer at a considerable distance above the floor on which the mixer is supported, a pair of upright tubular columns disposed a spaced distance in front of the mixer and the said opening therein, bearings in the upper and lower ends of the columns, vertically disposed screw shafts journaled in said bearings, non-rotatable nuts on said shafts movable thereon between upper and lower limits between said bearings on rotation of said shafts, a trough carriage holding a dough containing trough pivotally supported by said nuts between said columns, an inclined chute pivotal relative to said columns with its lower discharge end normally located just above said opening, housings on the rear walls of the columns, counterweights slidable in said housings, and flexible means connecting the upper end of said chute with said counterweights so that the latter tend to swing said chute toward said columns, stop means preventing said counterweights from swinging the upper end of said chute into the vertical path of travel of said carriage and trough thereon, cam blocks on the sides of said chute projecting toward said columns, said blocks from a raised surface of greatest projection at their upper ends falling off gradually to a surface of least projection at their lower ends, means on said columns for tipping the carriage and holder toward said chute when the carriage has been raised to certain height opposite the chute, followers on the carriage engaging first the upper ends of said cam blocks as said carriage tips to said chute to move the latter downwardly substantially to said opening prior to the time the dough mass spills over the trough, extensions for said screw shafts projecting a limited distance above said upper bearings, motor drive means on one of said columns below said extensions having a vertically disposed output shaft, sheaves on said output shaft and one of said extensions for transmitting the drive to a screw shaft and sheaves on both of said screw shafts for transmitting the drive from one screw shaft to another while permitting said extensions to be of minimum height, and continuous members around said sets of sheaves.

6. The combination defined in claim 5 in which vertical slots are provided in said columns to permit travel of said carriage supporting nuts, and guard tape rolls near the lower ends of said columns have their leading ends fixed to said nuts so that as the nuts move upwardly the tapes cover the said slots below them.

References Cited in the file of this patent

UNITED STATES PATENTS

| 567,100 | Hoy | Sept. 1, 1896 |
| 1,027,573 | Stebler | May 28, 1912 |
| 1,101,598 | Weinke | June 30, 1914 |
| 1,522,967 | Meyer et al. | Jan. 13, 1925 |
| 1,567,522 | Lepley | Dec. 29, 1925 |
| 1,716,030 | Collier | June 4, 1929 |
| 2,186,478 | Dehuff | Jan. 9, 1940 |
| 2,373,455 | Carey | Apr. 10, 1945 |
| 2,701,650 | Stevenson | Feb. 8, 1955 |